United States Patent [19]
Kihara et al.

[11] Patent Number: 5,459,210
[45] Date of Patent: Oct. 17, 1995

[54] PROCESSES FOR PRODUCING STYRENE COPOLYMERS

[75] Inventors: Hayato Kihara; Satoshi Nakagawa; Shuji Yoshimi, all of Ichihara, Japan

[73] Assignee: Sumitomo Chemical Company, Limited, Osaka, Japan

[21] Appl. No.: 197,718

[22] Filed: Feb. 17, 1994

[30] Foreign Application Priority Data

Feb. 18, 1993 [JP] Japan ................................ 5-028887
Jun. 30, 1993 [JP] Japan ................................ 5-161415
Oct. 20, 1993 [JP] Japan ................................ 5-262337

[51] Int. Cl.$^6$ .................................................... C08F 4/38
[52] U.S. Cl. ........................... 526/73; 526/228; 526/336; 526/347; 526/347.2; 528/481; 528/501
[58] Field of Search .................................... 528/481, 501; 526/73, 228, 336, 347, 347.2

[56] References Cited

U.S. PATENT DOCUMENTS 3,726,848  4/1973  Squire et al. ................................ 526/73
4,125,696  11/1978  Kamath ................................ 526/73
4,129,703  12/1978  Kamath et al. ........................ 526/228 X

FOREIGN PATENT DOCUMENTS 48-045590  6/1973  Japan.
2-170806   7/1990  Japan.
848620     9/1960  United Kingdom ................ 526/73

*Primary Examiner*—Fred Teskin
*Attorney, Agent, or Firm*—Sughrue, Mion, Zinn, Macpeak & Seas

[57] ABSTRACT

Disclosed are a styrene copolymer having a weight average molecular weight of about 200,000 to 2,000,000, having 1 to 20 branching points in the Z-average molecular weight, and having a methyl ethyl ketone/methanol mixture-insoluble matter content of not more than 5% by weight and a methanol-soluble matter content of not more than 5% by weight; processes for preparing the styrene copolymer; a polystyrene resin composition containing the styrene copolymer; and injection-molded article prepared by injection-molding the polystyrene resin composition.

2 Claims, No Drawings

PROCESSES FOR PRODUCING STYRENE COPOLYMERS

FIELD OF THE INVENTION

The invention relates to styrene copolymers, polystyrene resin compositions, and processes for producing styrene copolymers, and also relates to injection-molded articles. More particularly, the invention relates to a polystyrene resin composition which is excellent in flow and heat resistance characteristics and therefore conducive to a comparatively short molding cycle, and which is capable of giving a molded article having a low residual strain and improved impact resistance and improved appearance. The invention also relates to a styrene copolymer for use in said polystyrene resin composition, processes for producing the styrene copolymer and to a shaped article as injection-molded from said polystyrene resin composition.

PRIOR ART

Because of their remarkable rigidity, good dimensional stability and low cost, polystyrene resins are used in many molding applications. Recently, in the field of injection molding, it is demanded to reduce the molding cycle time, namely the time required for plasticization, injection, dwell and cooling, and thereby enhance the molding efficiency. In order to reduce this molding cycle time, the molding compound must show high fluidity during injection and solidify at a relatively high temperature in the cooling stage or be hard to soften at high temperature, that is to say it should have a high heat resistance.

Moreover, the residual strain in molded articles is also a problem. Thus, it is known that if the residual strain of a molded article is high, the impact strength of the molded article is markedly decreased and it is, therefore, necessary that the residual strain be controlled to the lowest possible level. It is generally considered that a residual strain is produced by fluid shearing of the resin during injection molding, and for the purpose of reducing the residual strain as well, it is necessary that the resin should have high flowability.

As an attempt to satisfy these requirements, it has been proposed to use a resin material of lower molecular weight to thereby enhance the flowability of the molding composition. However, this approach has the drawback that the strength of the resin is sacrificed to cause cracking on ejection of the molded product or during the use of the molded product.

As a method for enhancing the flowability of a resin composition without reducing the molecular weight of the resin, the addition of a plasticizer such as mineral oil has been proposed. However, this method is also disadvantageous in that the plasticizer so added tends to reduce the heat resistance and impact strength of the resin.

For enhancing the flowability of the resin while maintaining its heat resistance and impact strength, it was proposed to broaden the molecular weight distribution of the resin. Thus, Japanese Examined Patent Publications (Kokoku) 30843/1982, and 61231/1987 disclose a technique for providing resin compositions of broad molecular weight distribution by blending a high molecular polystyrene with a low molecular polystyrene or by employing a multi-stage polymerization process. However, these production processes are commercially disadvantageous in that both involve a complicated series of steps leading to an increase in production cost. Moreover, these methods cannot insure sufficiently high impact strength values.

Japanese Unexamined Patent Publications (Kokai) 45590/1973 and Kokai 170806/1990 disclose the technology for expanding the molecular weight distribution of the resin by using a compound containing a plurality of vinyl groups in the polymerization reaction. However, the resin compositions obtainable by this technology are of poor flowability.

SUMMARY OF THE INVENTION

Under the circumstances, objects of this invention are to provide a styrene copolymer and a polystyrene resin composition comprising said styrene copolymer having excellent flowability and heat resistance characteristics, hence conducive to a shorter molding cycle, and capable of giving molded articles having a minimum of residual stress and having excellent impact strength and appearance; to provide methods of producing said styrene copolymer for use in said polystyrene resin composition; and to provide molded articles as injection-molded from said polystyrene resin composition.

The first aspect of this invention is directed to a styrene copolymer having a weight average molecular weight of 200,000 to 2,000,000, having 1 to 20 branching points in the Z-average molecular weight, and having a methyl ethyl ketone/methanol mixture-insoluble matter content of not more than 5% by weight and methanol-soluble matter content of not more than 5% by weight.

This invention also provides a polystyrene resin composition containing a styrene copolymer and at least one additive, the styrene copolymer having a weight average molecular weight of 200,000 to 2,000,000, having 1 to 20 branching points in the Z-average molecular weight and having a methyl ethyl ketone/methanol mixture-insoluble matter content of not greater than 5 weight % and a methanol-soluble matter content of not greater than 5 weight %.

The invention is also directed to a method of producing the styrene copolymer of the first invention, which comprises the steps of continuously feeding a homogeneous mixture of a styrene compound and 100 to 900 ppm by weight, relative to said styrene compound, of a compound having a plurality of vinyl groups, optionally together with a compound copolymerizable with said styrene compound, to a polymerization vessel, carrying out polymerization at a temperature which is higher than Tc (°C.) defined by the following equation:

$$Tc=0.05 \times M+120$$

where M is the amount (wt.ppm) of the compound having a plurality of vinyl groups used, until a final conversion of not less than 60% by weight is reached, introducing the polymerization mixture into a preheater maintained at 200° to 280° C., passing said mixture at 200° to 280° C. through a vacuum deaerator to thereby separate the unreacted monomers and recovering the desired styrene copolymer.

This invention further provides a method of producing the styrene copolymer of the first invention, which comprises the steps of feeding a homogeneous mixture of a styrene compound and 100 to 900 wt.ppm, relative to said styrene compound, of a compound having a plurality of vinyl groups, optionally together with a compound copolymerizable with said styrene compound, to a polymerization vessel, and subjecting the mixture to a two-stage suspension polymerization comprising a first stage and a second stage using an initiator having a 10 hour-half-life temperature (i.e., the temperature at which an amount of the initiator becomes half in 10 hours, and the details are described later) of lower than 100° C. in an amount of about 2000 to 3000 wt.ppm relative to the styrene compound and also using an initiator having a 10 hour-half-life temperature of at least 100° C. in an amount of about 200 to 1000 wt.ppm relative to the styrene compound, until a final conversion of at least 97 wt. % is reached, wherein in said first stage the polymerization is conducted at a polymerization temperature of at least 80° C. but lower than 100° C. for about 3 to 7 hours and in said second stage the polymerization is conducted at a polymerization temperature of 100° to 150° C. for about 0.5 to 2 hours.

The invention is additionally directed to a shaped article as injection-molded from the above polystyrene resin composition.

DETAILED DESCRIPTION

These aspects of this invention are now described in detail.

The polystyrene resin composition of this invention comprises a styrene copolymer as the polymer component. The styrene compound as a constituent unit of said styrene copolymer includes, among others, styrene, α-substituted alkylstyrenes, particularly styrene having in its α-position a $C_1$–$C_4$ alkyl group such as methyl, ethyl, propyl, isopropyl, butyl, t-butyl, etc., such as α-methylstyrene as well as nuclearly substituted alkylstyrenes, particularly styrene having one or two $C_1$–$C_4$ alkyl groups on the benzene ring, such as p-methylstyrene.

In the practice of this invention, a compound containing at least two, particularly 2 to 4, vinyl groups is used in combination with said styrene compound. This combination gives a polystyrene resin composition characteristic of this invention. The compound containing at least two or a plurality of vinyl groups include, among others, divinylbenzene, di- or triacrylate or di- or trimethacrylate of a polyhydric alcohol having 2 to 3 hydroxyl groups and having 2 to 46 carbon atoms, such as ethylene glycol, polyethylene glycols (polymerization degree: 2–23), or the like. Preferred are divinyl benzene, ethylene glycol dimethacrylate and so on.

Relative to the styrene compound, the compound containing a plurality of vinyl groups is usually used during copolymerization in an amount of about 100 to 900 weight ppm, preferably about 100 to 700 weight ppm. When the amount of the compound containing at least two vinyl groups is below 100 weight ppm, it is difficult to obtain the branching points in Z average molecular weight within the desired range. On the other hand, when the above-mentioned amount is excessive, it is difficult to obtain a copolymer having a methyl ethyl ketone/methanol mixture-insoluble matter content within the desired range.

When the compound containing a plurality of vinyl groups is used in the above-mentioned amount in the copolymerization processes according to the invention, the resulting styrene copolymer generally contains the compound containing a plurality of vinyl groups, as copolymerized, in an amount of about 100 to 1200 weight ppm relative to the resulting styrene copolymer. It is preferable that the styrene copolymer contains said compound containing a plurality of vinyl groups, as copolymerized, in an amount of about 100 to 900 weight ppm relative to the styrene copolymer.

According to our research, the content of the compound containing a plurality of vinyl groups in the styrene copolymer is related to the amount of said compound used in the copolymerization process and the conversion, and the relation is expressed by the following equation:

$$z = y \cdot \{1 - (1-x)^2\}/x$$

wherein z is the content (weight ppm) of the compound containing a plurality of vinyl groups, as copolymerized, in the styrene copolymer, y is the amount (weight ppm, relative to the styrene compound) of the compound containing a plurality of vinyl groups used in the copolymerization process, and x is the conversion ($0 \leq x \leq 1$). Herein, the conversion (0–100%) is expressed as x=0–1.

Furthermore, in the practice of this invention, a compound copolymerizable with said styrene compound can also be employed, if so desired. Examples of such compound are vinyl monomers such as acrylonitrile, methacrylonitrile, methacrylic acid, its ester derivatives, especially its lower alkyl ($C_1$–$C_4$) esters, such as methyl methacrylate, etc., maleic anhydride, maleimide, nuclearly substituted maleimide compounds represented by the formula

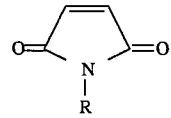

wherein R is phenyl or a $C_1$–$C_4$ alkyl group. Such compound copolymerizable with the styrene compound can be used in an amount of up to about 50 wt. %, preferably about 0 to 30 wt. %, based on the styrene compound.

The styrene copolymer of this invention has a weight average molecular weight of about 200,000 to 2,000,000, preferably about 200,000 to 1,000,000, and more preferably about 300,000 to 1,000,000. Herein, the weight average molecular weight is determined by the conventional gel permeation chromatography (GPC) method using a standard monodisperse polystyrene. When the molecular weight is below the above lower limit, insufficient impact strength would generally result. On the other hand, when the molecular weight is over the above upper limit, the flowability of the composition tends to be sacrificed.

The styrene copolymer of this invention has a Z-branch count (i.e., the number of branching points in its Z-average molecular weight) of 1 to 20, preferably 2 to 20 and more preferably 2 to 15. If this Z-branch count is below 1, flowability is sacrificed, while an excessive branch count often results in poor flowability and poor appearance of the molded article.

The Z-branch count or the number of branching points in the Z-average molecular weight (Mz) signifies the number of branching points in a molecular chain representing the high molecular weight fraction which is considered to lower the flowability of a styrene copolymer having a given molecular weight distribution and is determined by the following procedure. Thus, the number of branching points in the Z-average molecular weight (Mz) can be determined by the viscosity-GPC method using a gel permeation chromatograph (GPC) equipped with a differential refractometer and a viscometer as detectors, and a detailed description of the measurement of Z-branch count can be found in Journal of the Society of Rubber Industry, Japan Vol. 45, No. 2, pp. 105–118, 1972. The Z-branch count (abbreviated as "Bn(Mz)") can be calculated by the following equation:

$$[IV(Mz)/IV_L(Mz)]^{2/3} = [(1+Bn(Mz)/7)^{1/2} + 4/9 \cdot Bn(Mz)]^{-1/2}$$

where IV(Mz) and $IV_L$(Mz) are the intrinsic viscosity values, for Mz, of the test sample and the standard linear polystyrene sample, respectively, as measured by the viscosity-GPC method.

The styrene copolymer of this invention contains matter insoluble in a methyl ethyl ketone/methanol mixture in an amount of not more than 5 wt. %, preferably not more than 3 wt. %. When the content of said insoluble matter is excessive, the flowability of the resin composition is sacrificed, and even if it is molded, the molded product will be poor in appearance. The content of the matter insoluble in a methyl ethyl ketone/methanol mixture is determined by the following procedure. Thus, 0.5 g of the styrene copolymer is dissolved in 50 ml of methyl ethyl ketone/methanol mixture (10/1, by volume) at room temperature with stirring for 2 hours. This solution is filtered with a glass fiber filter (retention particle size 0.6 μm) and the insoluble matter separated on the filter is dried and accurately weighed. The content of said methyl ethyl ketone/methanol mixture-insoluble matter is defined by the weight percentage of the insoluble fraction separated by this procedure relative to the styrene copolymer.

The styrene copolymer of this invention has a methanol-soluble matter content of not more than 5 wt. %, preferably not more than 3 wt. %. Heat resistance is sacrificed when this methanol-soluble fraction content is excessive. The methanol-soluble fraction content is determined by the following procedure. Thus, about 1 g of the styrene copolymer is dissolved in 10 ml of methyl ethyl ketone at room temperature and precipitated by adding 300 ml of methanol. The precipitate is collected by filtration with use of a filter paper (water flow rate 15 sec, retention particle size 0.6 μm), dried and accurately weighed. The weight percentage of the fraction lost by the above procedure relative to the styrene copolymer used is referred to as the methanol-soluble matter content.

The term "retention particle size" used herein means the size of the smallest particle that can be trapped by the filter in question. The term "water flow rate" used herein means the time required for passing 1000 ml of particle-free water through a 9.6 cm$^2$ filter paper at 20° C. and 0.4 kg/cm$^2$.

The molecular weight distribution of the styrene copolymer of this invention, as determined by the GPC method, is preferably such that fractions having molecular weights of not more than 100,000 are present in an amount of 20 to 40 wt. %, preferably 20 to 30 wt. %, and fractions having molecular weights of at least 1,000,000 are present in an amount of 1 to 30 wt. %, preferably 5 to 30 wt. %. When these proportions are outside of the respective ranges, the balance between flowability and heat resistance tends to be disturbed and the impact strength may also be sacrificed.

The styrene copolymer of this invention preferably has a melt flow rate (MFR: g/10 min.) of not less than the value A which is defined by the following equation:

$$A=(13.2-0.11 \times VSP)/(2.5 \times 10^{-4} \times Mw^{0.7}-1.2)$$

where VSP denotes the Vicat softening point (°C.) and Mw denotes the weight average molecular weight of the styrene copolymer in question.

If the melt flow rate is below the value A, the flowability and heat resistance will be poorly balanced and the impact strength may be inferior in certain instances. There is no specific restriction on the upper limit of the melt flow rate of the styrene copolymer of the invention. Generally, however, it is preferable that the styrene copolymer has a melt flow rate of not less than the value A and not greater than about 50 g/10 min.

The styrene copolymer of the invention can be produced by batchwise suspension polymerization or continuous bulk polymerization, either in the manner of thermal polymerization or using an initiator. The polymerization initiator may be any of various radical polymerization initiators conventionally used in the art. The polymerization reactor may be a thorough mixing type stirring vessel for polymerization, a plug flow type flooded (vertical or horizontal) polymerization vessel, a static mixer tube type polymerization vessel or a combination of such vessels.

When a suspension polymerization process is employed, the styrene copolymer of the invention can be produced preferably by the following method. First, a homogeneous mixture of a styrene compound and 100 to 900 wt.ppm (preferably 100 to 700 wt.ppm), relative to said styrene compound, of a compound having a plurality of vinyl groups is fed to a polymerization vessel, optionally together with a compound copolymerizable with the styrene compound, and the mixture is subjected to a two-stage suspension polymerization comprising a first stage and a second stage. In the two-stage suspension polymerization, two types of initiators are used. One type of the initiator has a 10 hour-half-life temperature of lower than 100° C., preferably about 60° to 99° C., and is used in an amount of about 2000 to 3000 wt.ppm, preferably about 2000 to 2600 wt.ppm, relative to the styrene compound. The other type of the initiator has a 10 hour-half-life temperature of at least 100° C., preferably about 100° to 140 ° C., and is used in an amount of about 200 to 1000 wt.ppm, preferably about 200 to 800 wt.ppm, relative to the styrene compound. The suspension polymerization is conducted until a final conversion of at least 97 wt. % is reached. In said first stage, the polymerization is conducted at a polymerization temperature of at least 80° C. but lower than 100° C., preferably about 85° to 95° C., for 3 to 7 hours, preferably about 3.5 to 6 hours. In the second stage, the polymerization is conducted at a polymerization temperature of 100° to 150° C., preferably about 120° to 150° C., for 0.5 to 2 hours, preferably about 0.5 to 1.5 hours.

The term "10 hour-half-life temperature" used herein means a temperature at which the amount of the initiator is reduced to half of the initial amount when a 0.05 mol/l solution of said initiator in benzene is left to stand for 10 hours in nitrogen atmosphere. The initiators useful in the two-stage suspension polymerization are suitably selected from conventional radical polymerization initiators, and the 10 hour-half-life temperature is easily determined by one skilled in the art. Examples of the initiators having a 10 hour-half-life temperature of lower than 100° C. are benzoyl peroxide, 1,1-bis(tert-butylperoxy)-3,3,5-trimethylcyclohexane, t-butyl peroxy(2-ethylhexanoate), poly{dioxy(1,1, 4,4-tetramethyl-1,4-butanediyl)dioxycarbonyl-1,4-cyclohexanecarbonyl}, 2,2-Bis(4,4-di-t-butylperoxycyclohexyl)propane and the like. Examples of the initiators having a 10 hour-half-life temperature of at least 100° C. are tert-butyl peroxybenzoate, di-t-butyl peroxide, dicumyl peroxide, 2,2-Bis(t-butylperoxy)butane, t-butyl peroxyacetate and the like. These two types of initiators are preferably added to the reaction system prior to the initiation of the two-stage suspension polymerization.

The reaction medium for the suspension polymerization is an aqueous medium such as water, and the dispersant may be a conventional one such as sodium tertiary phosphate, polyvinyl alcohol or the like, preferably in combination with an auxiliary dispersant such as sodium dodecylbenzenesulfonate or the like. The amount of such dispersant is usually about 1–3 wt % relative to the aqueous medium.

When the continuous bulk polymerization process is employed, the styrene copolymer of this invention can optimally be produced in the following manner. Thus, the styrene compound and 100 to 900 ppm by weight, preferably 100 to 700 ppm by weight, relative to said styrene compound, of the compound having a plurality of vinyl groups are homogeneously mixed in advance, and the mixture is continuously fed, optionally together with a compound copolymerizable with the styrene compound, to the polymerization vessel, and the polymerization is conducted until the final conversion reaches at least 60 wt. %, preferably at least 70 wt. %. It is important to carry out the polymerization at a temperature which is higher than Tc (°C.) defined by the following equation:

$$Tc=0.05 \times M+120$$

where M is the amount (wt.ppm) of the compound having a plurality of vinyl groups used. It is preferable to conduct the polymerization at a temperature of higher than Tc but lower than (Tc+60) °C. The polymerization mixture is then introduced into a preheater maintained at 200° to 280° C., preferably 220° to 270° C., and then passed through a vacuum deaerator at 200° to 280° C., preferably 220° to 270° C., whereby the unreacted monomers are recovered and the desired styrene copolymer is obtained. It is preferable that the polymerization mixture be retained in the preheater for about 5 to about 20 minutes and in the deaerator for about 20 to about 60 minutes.

In the above bulk polymerization process, if desired, an organic solvent capable of dissolving the resulting styrene copolymer, such as ethylbenzene or the like may be added to the reaction system for reducing the viscosity of the polymerization reaction system. The amount of such organic solvent is up to about 10 wt % of the polymerization mixture.

When the proportion of the compound containing at least two vinyl groups is too small, the number of branching points in the Z-average molecular weight can hardly be attained, and therefore the flowability and heat resistance will be ill balanced. Conversely, when the proportion of said compound is excessive, it is difficult to obtain the MEK/MeOH-insoluble matter content within the desired range, and therefore the flowability will be poor. If the polymerization of the styrene compound alone is partially conducted beforehand and then the compound containing at least two vinyl groups is added, followed by polymerization, three-dimensionally crosslinked portions will be formed as a result of homopolymerization of the compound containing at least two vinyl groups, and the content of the matter insoluble in methyl ethyl ketone/methanol mixture will become excessive. If the polymerization reaction is terminated when the conversion remains yet to reach the level specified above, unreacted vinyl groups will remain in the product polymer so that a satisfactory branched structure will not be obtained and the resulting styrene copolymer and the resin composition containing such styrene copolymer may sometimes be inferior in flowability.

The polystyrene resin composition of the invention comprises the above styrene copolymer, in admixture with one or more additives selected, as necessary, from among various conventional plasticizers (e.g. mineral oil), lubricants, antistatic agents, antioxidants, heat stabilizers, ultraviolet absorbers, pigments, dyes, and so forth. Preferred examples of antioxidants are those commercially available under the trademark of Sumilizer® BHT (2,6-di-t-butyl-4-methylphenol), Irganox® 1076 (n-octadecyl 3-(3,5-di-t-butyl-4-hydroxyphenyl)propionate), Irganox® 245 (triethyleneglycol bis-3-(3-t-butyl-4-hydroxy-5-methylphenyl)propionate) or the like. Preferred examples of heat stabilizers are those commercially available under the trademark of Sumilizer® GM (2-t-butyl-6-(3-t-butyl-2-hydroxy-5-methylbenzyl)-4-methylphenyl acrylate), Sumilizer® GS (2-[1-(2-hydroxy-3,5-di-t-pentylphenyl)ethyl]-4,6-di-t-pentylphenyl acrylate) or the like. Preferable examples of lubricants are stearic acid, zinc stearate, calcium stearate, glycerol monostearate, ethylene-bis-stearamide, etc. Typical examples of antistatic agents are sodium alkylsulfonate, N-hydroxyethyl-N-2-hydroxyalkylamines, etc. Examples of plasticizers are oils such as mineral oils, silicone oils (e.g. dimethyl polysiloxanes), etc.

Said polystyrene resin composition may further contain a polystyrene resin composition other than that of the present invention such as conventional general-purpose polystyrenes (GPPS), high-impact polystyrenes (HIPS) and/or a regenerated or recycled polystyrene resin; elastomers (e.g., polybutadienes, styrene-butadiene block rubber, styrene-butadiene-styrene triblock rubber, etc.), polyphenylene ethers (PPE) or the like, within the limits not detracting from the effects of this invention. The additives and/or the above polystyrene resins, elastomers, PPE, etc. may be added to the polymerization vessel prior to or during the polymerization, whereby the polystyrene resin composition of the invention can be obtained upon completion of the polymerization. Alternatively, the additives or other polystyrene resins may be admixed or blended with the isolated styrene copolymer of the invention.

The amounts of the above additives and the resins are within the conventionally employed ranges. For example, the polystyrene resin composition of the invention may contain the foregoing additives and polystyrene resins (e.g., GPPS, HIPS), elastomers, polyphenylene ethers, etc. in an amount shown below based on the polystyrene resin composition.

|  | Approximate amount |
| --- | --- |
| Antioxidants | 0.05 to 0.5 wt % |
| Heat stabilizers | 0.05 to 0.5 wt % |
| Ultraviolet absorbers | 0.05 to 0.5 wt % |
| Lubricants | 0.05 to 0.5 wt % |
| Antistatic agents | 0.05 to 5 wt % |
| Pigments | 50 ppb to 1000 ppm |
| Dyes | 50 ppb to 1000 ppm |
| Oils | 0 to 5 wt % |
| HIPS | 0 to 50 wt % |
| GPPS | 0 to 50 wt % |
| Regenerated polystryrene | 0 to 50 wt % |
| PPE | 0 to 50 wt % |
| Elastomers | 0 to 30 wt % |

The polystyrene resin composition of the invention can be injection-molded under a conventional condition, for example, at a resin temperature of 230° C., an injection speed of 80 cm/sec., an injection pressure of 900 kg/cm$^2$ and a mold temperature of 40° C. In the practice of the invention, the method of injection molding is not critical, however.

The resulting molded articles thus obtained are low in residual strain and excellent in impact strength and appearnce.

EXAMPLES

The following examples are further illustrative of this invention. The measurement and evaluation methods other than those mentioned above were as follows.
(1) Flowability
i) Melt flow rate (MFR)

Three measurements were carried out as described in JIS K 6871 at the resin temperature of 200° C. and the load of 5 kg. Each reported value is the mean of three measurements.

ii) Length of a spiral flow in injection molding

The test was performed using an elliptical spiral mold and a Toshiba model IS150E injection molding machine at a cylinder temperature of 230° C. or 250° C., a mold temperature of 40° C. and an injection pressure of 800 kg/cm$^2$. Ten moldings were taken as samples and the mean length of a spiral flow was determined.

(2) Heat resistance (Vicat softening point)

The test was performed as described in JIS K 6871 under the load of 5 kg.

(3) Impact strength (falling ball impact test)

In Examples 1 to 4 and Comparative Examples 1 to 5, each resin composition was press-molded at 200° C. to the dimensions 50 mm×50 mm and 2 mm in thickness and the 50% failing height (the height of the ball at which 50% of specimens failed) was determined as described in JIS K 7211 except that the ball weight was 28.2 g. In addition, in Examples 1, 2 and 5 to 10 and Comparative Examples 1, 2, 3 and 6 to 11, plates, 90 mm×150 mm and 2 mm in thickness, were prepared by injection molding at the resin temperature of 230° C., and specimens, 50 mm×50 mm and 2 mm in thickness, were cut out therefrom and the 50% failing height was determined as described in JIS K 7211 except that the ball weight was 28.2 g. The higher the value of said height is, the higher is the impact strength.

(4) Appearance of moldings

Each resin composition was injection-molded at the resin temperature of 220° C into plates, 90 mm×150 mm and 2 mm in thickness. The plates were macroscopically evaluated as follows:

o—smooth surface and, transparent;

x—roughened surface and opaque.

(5) Residual strain

Plates, 90 mm×150 mm and 2 mm in thickness, were prepared by injection molding at the resin temperature of 230° C. and subjected to retardation measurement in the central part thereof. For the retardation measurement, an Otsuka Denshi model MCPD-1000 multi-channel photo detecting system was used. The term "retardation" as used herein means the phase difference between the cross polarized waves after transmission as found when waves are transmitted through the plate. Division of the retardation by the thickness of the test specimen plate gives the index of birefringence. The index of birefringence is related to the principal stress (principal strain) within the plate, and it can be said that the higher the index of birefringence, the greater the residual strain. In this test, the plates used had the same thickness. Therefore, a higher value of retardation corresponds to a higher level of residual strain. The details of the relationship between index of birefringence and residual strain is described, for example, in the monograph "Kodansei Jikkenhou (Photo-elasticity Experiments)" (written by Tsuji et al., published by Nikkan Kogyo Shinbun-sha, 1965). For the retardation measurement, the method described in the monograph "Henko-kenbikyo no Tsukaikata (How to Use Polarization Microscopes)" (written by Kenya Hamano, published by Gihodo) was used.

Examples 1 to 4 and Comparative Examples 1 to 5

A 20-liter autoclave was charged with 8 kg of water, 8 kg of styrene, 0.13 kg of sodium tertiary phosphate (dispersant) and 0.16 g of sodium dodecylbenzenesulfonate and, using the initiator specified in Tables 1 and 2 and divinylbenzene (as the compound containing at least two vinyl groups; purity 55% by weight, product of Tokyo Kasei Kogyo), suspension polymerization was carried out under the condition shown in Tables 1 and 2 to give polystyrene beads. The beads were washed, dehydrated, dried and pelletized at 210° C. using a 40 mm diameter extruder.

Then, using a model J150E nonvent injection molding machine (manufactured by Japan Steel Works Co., Ltd.), the pellets were injection-molded into plates, 90 mm×150 mm and 2 mm in thickness, at a resin temperature of 230° C., injection speed of 80 cm/sec, injection pressure of 900 kg/cm$^2$ and mold temperature of 40° C. The results are shown in Tables 1 and 2.

The results indicate the following. In Examples 1 to 4 where the requirements of this invention are satisfied, the results are satisfactory for all the evaluation items.

On the other hand, in Comparative Example 1 in which the resin has no branches, the flowability is poor, and the residual strain is great and the impact strength is poor. In Comparative Example 2 in which the resin has no branches and the weight average molecular weight is relatively small, the impact strength is poor. In Comparative Example 3 in which the resin has no branches and the methanol-soluble matter content is excessive, the heat resistance is poor and the injection moldings have poor impact strength. In Comparative Example 4 in which the weight average molecular weight and the number of branching points are excessive, the flowability is poor and the moldings show surface roughening and are inferior in appearance. In Comparative Example 5 in which the methyl ethyl ketone/methanol mixture-insoluble matter content is excessive, the flowability is very poor and molding was impossible, and therefore there are no evaluation data.

Examples 5 to 8 and Comparative Examples 6 to 9

Divinylbenzene (purity 55% by weight, product of Tokyo Kasei Kogyo) was used as the compound containing a plurality of vinyl groups. A solution containing ethylbenzene and the monomers having the monomer composition given in Tables 3 and 4 was continuously fed to a continuous bulk polymerization vessel, and polymerization was carried out at the polymerization temperature shown in Tables 3 and 4 until the final conversion shown in Tables 3 and 4 was attained. The polymerization mixture was introduced into a preheater maintained at 240° C. and retained there for 10 minutes and then passed through a vacuum deaerator at 240° C. over 20 minutes for recovering unreacted monomers. Resin pellets (polystyrene compositions) were thus obtained. The results are shown in Tables 3 and 4.

Example 9

The procedure of Example 8 was repeated with the exception of using ethylene glycol dimethacrylate (purity at least 97% by weight, product of Tokyo Kasei Kogyo) as the compound having a plurality of vinyl groups.

Comparative Example 10

The procedure of Example 5 was followed except that divinylbenzene was added to the polymerization system when the conversion of 60% by weight was reached and that the final conversion was 80% by weight.

The results shown in Tables 3 and 4 indicate the following. In Examples 5 to 9 wherein the requirements of the invention are satisfied, the flowability and heat resistance are well balanced and the impact strength test results are excellent.

On the other hand, in Comparative Examples 6 and 7 in which the use of divinylbenzene was omitted and therefore the resins had no branches, the flowability and heat resistance are ill balanced and the impact strength is inferior. In Comparative Example 8 in which the number of branching points and the content of fractions greater than 1,000,000 in molecular weight are excessive, the MFR value is lower than the value A and the balance between flowability and heat resistance is unsatisfactory and the impact strength is unsatisfactory. In Comparative Example 9 in which the final conversion is too low, no branched structure can be obtained and the flowability and heat resistance are ill balanced and the impact strength is poor. In Comparative Example 10 in which the polymerization is conducted without uniformly admixing divinylbenzene with styrene in advance, the resulting resin gives a cloudy solution when dissolved in tetrahydrofuran, indicating the formation of three-dimensionally crosslinked polymers, and the moldings are inferior in appearance.

TABLE 1

| | Example | | | |
|---|---|---|---|---|
| | 1 | 2 | 3 | 4 |
| Polymerization initiator wt ppm *1 | | | | |
| PO1 | 2200 | 2100 | 2200 | 2100 |
| PO2 | 750 | 350 | 750 | 550 |
| PO3 | 0 | 0 | 0 | 0 |
| Divinylbenzene wt ppm *2 | 300 | 100 | 500 | 300 |
| Mineral oil, wt % | 0 | 0 | 0 | 0 |
| Polymerization temperature/period (hrs) | | | | |
| 90° C. | 4 | 6 | 4 | 4 |
| 140° C. | 1.5 | 1.0 | 1.5 | 1.5 |
| Final conversion wt % *3-1 | 99.8 | 99.8 | 99.8 | 99.8 |
| Weight average molecular weight, ×10000 | 39 | 39 | 86 | 52 |
| Number of branching points *4 | 3.4 | 2.0 | 10.0 | 5.4 |
| MEK/MeOH-insoluble matter, wt % *5 | 0 | 0 | 0 | 0 |
| MeOH-soluble matter wt % *6 | 0.6 | 0.7 | 0.6 | 0.6 |
| MFR, g/10 min. | 5.2 | 3.5 | 1.7 | 2.9 |
| Length of spiral flow, mm | | | | |
| 230° C. | 530 | 500 | 450 | 450 |
| 250° C. | 660 | 630 | 520 | 580 |
| Vicat softening point, °C. | 103 | 103 | 103 | 103 |
| Impact strength, cm | | | | |
| Press molding | 41 | 47 | 54 | 49 |
| Injection molding | 43 | 46 | — | — |
| Residual strain, nm | 2200 | 2300 | — | — |
| Molding appearance | o | o | o | o |

TABLE 2

| | Comparative Example | | | | |
|---|---|---|---|---|---|
| | 1 | 2 | 3 | 4 | 5 |
| Polymerization initiator wt ppm *1 | | | | | |
| PO1 | 0 | 2100 | 0 | 2100 | 2200 |
| PO2 | 550 | 350 | 550 | 350 | 750 |
| PO3 | 1300 | 0 | 1300 | 0 | 0 |
| Divinylbenzene wt ppm *2 | 0 | 0 | 0 | 700 | 1000 |
| Mineral oil, wt % | 0 | 0 | 4 | 0 | 0 |
| Polymerization temperature/period (hrs) | | | | | |
| 90° C. | 8 | 6 | 8 | 8 | 4 |
| 140° C. | 1.0 | 1.0 | 1.0 | 1.0 | 1.5 |
| Final conversion wt % *3-1 | 99.8 | 99.8 | 99.8 | 99.8 | 99.8 |
| Weight average molecular weight, ×10000 | 45 | 26 | 45 | 210 | 162 |
| Number of branching points *4 | 0 | 0 | 0 | 21.6 | 18.1 |
| MEK/MeOH-insoluble matter, wt % *5 | 0 | 0 | 0 | 3.6 | 7.6 |
| MeOH-soluble matter wt % *6 | 0.8 | 1.0 | 5.4 | 0.6 | 0.7 |
| MFR, g/10 min. | 0.6 | 3.6 | 2.5 | 0.1 | * |
| Length of spiral flow, mm | | | | | |
| 230° C. | — | 460 | 430 | — | * |
| 250° C. | — | 550 | 510 | — | * |
| Vicat softening point, °C. | 103 | 103 | 88 | 103 | * |
| Impact strength, cm | | | | | |
| Press molding | 43 | 36 | 40 | 58 | * |
| Injection molding | 27 | 29 | 24 | — | * |
| Residual strain, nm | 4200 | 2400 | 2200 | — | * |
| Molding appearance | o | o | o | x | * |

*: Measurement impossible

TABLE 3

| | Example | | | | |
|---|---|---|---|---|---|
| | 5 | 6 | 7 | 8 | 9 |
| Monomers | | | | | |
| Styrene, wt % | 95 | 92 | 92 | 95 | 95 |
| Ethylbenzene, wt % | 5 | 5 | 5 | 5 | 5 |
| Divinylbenzene wt ppm *2 | 300 | 300 | 300 | 500 | 0 |
| EGMA, wt ppm *7 | 0 | 0 | 0 | 0 | 500 |
| Mineral oil, wt % | 0 | 3 | 3 | 0 | 0 |
| Polymerization temperature °C. | 160 | 160 | 150 | 160 | 160 |
| Final conversion wt % *3-2 | 80 | 80 | 80 | 80 | 80 |
| Weight average molecular weight, ×10000 | 31 | 33 | 40 | 52 | 38 |
| Mol. wt. < $10^5$ wt % *8 | 28.0 | 28.1 | 24.4 | 23.4 | 25.0 |
| mol. wt. > $10^6$ wt % *9 | 5.1 | 6.2 | 8.8 | 17.1 | 6.1 |
| Number of branching points *4 | 3.4 | 4.6 | 4.1 | 10.1 | 4.5 |
| MEK/MeOH-insoluble matter, wt % *5 | 0 | 0 | 0 | 0 | 0 |
| MeOH-soluble matter wt % *6 | 1.6 | 4.5 | 4.3 | 1.2 | 1.4 |
| Value of A | 3.7 | 5.3 | 3.8 | 1.5 | 2.5 |
| MFR, g/10 min. | 5.2 | 8.0 | 4.2 | 1.7 | 3.5 |
| Length of spiral flow, mm | | | | | |
| 230° C. | — | — | — | — | — |
| 250° C. | — | — | — | — | — |
| Vicat softening point, °C. | 102 | 90 | 90 | 102 | 102 |
| Impact strength, cm Injection molding | 41 | 42 | 46 | 50 | 44 |
| Molding appearance | o | o | o | o | o |

TABLE 4

|  | Comparative Example | | | | |
| --- | --- | --- | --- | --- | --- |
|  | 6 | 7 | 8 | 9 | 10 |
| Monomers |  |  |  |  |  |
| Styrene, wt % | 92 | 92 | 95 | 95 | 95 |
| Ethylbenzene, wt % | 5 | 5 | 5 | 5 | 5 |
| Divinylbenzene wt ppm *2 | 0 | 0 | 50 | 300 | 300 |
| EGMA, wt ppm *7 | 0 | 0 | 0 | 0 | 0 |
| Mineral oil, wt % | 3 | 3 | 0 | 0 | 0 |
| Polymerization temperature °C. | 130 | 120 | 160 | 140 | 160 |
| Final conversion wt % *3-2 | 70 | 70 | 80 | 50 | 80 |
| Weight average molecular weight, ×10000 | 33 | 39 | 27 | 27 | 22 |
| Mol. wt. < $10^5$ wt % *8 | 21.6 | 15.3 | 26.7 | 30.8 | 38.0 |
| Mol. wt. > $10^6$ wt % *9 | 4.1 | 5.7 | 0.6 | 4.4 | 0.2 |
| Number of branching points *4 | 0 | 0 | 0.8 | 0 | 0 |
| MEK/MeOH-insoluble matter, wt % *5 | 0 | 0 | 0 | 0 | 2.0 |
| MeOH-soluble matter wt % *6 | 4.4 | 4.2 | 1.6 | 1.0 | 1.4 |
| Value of A | 5.4 | 4.0 | 5.1 | 5.3 | 11.5 |
| MFR, g/10 min. | 4.2 | 2.0 | 5.0 | 3.5 | 10.0 |
| Length of spiral flow, mm |  |  |  |  |  |
| 230° C. | — | — | — | — | — |
| 250° C. | — | — | — | — | — |
| Vicat softening point, °C. | 90 | 90 | 102 | 102 | 102 |
| Impact strength, cm | 32 | 32 | 30 | 23 | 20 |
| Injection molding |  |  |  |  |  |
| Molding appearance | o | o | o | o | x |

*1 Polymerization initiators
PO1 = Benzoyl peroxide
PO2 = Tert-butyl peroxybenzoate
PO3 = 1,1-Bis(tert-butylperoxy)-3,3,5-trimethyl cyclohexane
The numerical values are in ppm by weight relative to the styrene compound.
*2 Divinylbenzene: The numerical values are in ppm by weight relative to the styrene compound.
*3-1 Final conversion: A solution was prepared by dissolving 0.5 g (accurately weighed) of the polystyrene beads obtained in 20 ml of dimethylformamide and adding 1 ml of trimethylbenzene as an internal standard. The solution was subjected to gas chromatography and the residual styrene concentration (percent/beads) was determined. The final conversion was calculated as (100 − residual styrene concentration).
*3-2 Final conversion: The polymerization solution was sampled from the line between the polymerization vessel and the preheater, and about 0.1 g of the solution was accurately weighed and dried under vacuum at 80° C. for 1 hour and then at 150° C. for 2 hours, and the final conversion was calculated by dividing the weight after drying by the weight before drying and expressed in terms of percentage.
*4 Number of branching points (Z-branch count): Number of branching points in the Z-average molecular weight {Bn(Mz)}.
*5 MEK/MeOH insoluble matter: Content of the fraction insoluble in methyl ethyl ketone/methanol mixture.
*6 MeOH soluble matter: Content of the fraction soluble in methanol
*7 EGMA: Ethylene glycol dimethacrylate. The numerical values are in ppm by weight relative to the styrene compound.
*8 Mol. wt. < $10^5$: Weight percentage of molecules not greater than 100,000 in molecular weight in the molecular weight distribution of the styrene copolymer.
*9 Mol. wt. > $10^6$: Weight percentage of molecules not less than 1,000,000 in molecular weight in the molecular weight distribution of the styrene copolymer.

As detailed described hereinabove, the present invention can provide polystyrene resin compositions excellent in flowability and heat resistance and capable of giving moldings excellent in impact strength and appearance and low in residual strain. With the resin compositions, the molding cycle time can be shortened. The invention further provides a method of producing styrene copolymers for use in said polystyrene resin compositions as well as injection-molded articles made of said polystyrene resin compositions.

What is claimed is:

1. A method of producing a styrene copolymer having a weight average molecular weight of about 200,000 to 2,000,000, having 1 to 20 branching points in the Z-average molecular weight, and having a methyl ethyl ketone/methanol mixture-insoluble matter content of not more than 5% by weight and a methanol-soluble matter content of not more than 5% by weight, which comprises the steps of a) continuously feeding a homogeneous mixture of a styrene compound and 100 to 900 ppm by weight, relative to said styrene compound, of a compound having a plurality of vinyl groups to a polymerization vessel, optionally together with a compound copolymerizable with said styrene compound, b) carrying out polymerization at a temperature which is higher than Tc (°C.) defined by the following equation:

$$Tc = 0.05 \times M + 120$$

where M is the amount (wt.ppm) of the compound having a plurality of vinyl groups used until a final conversion of not less than 60% by weight is reached, c) introducing the polymerization mixture into a preheater maintained at 200° to 280° C., d) passing said mixture at 200° to 280° C. through a vacuum deaerator to thereby separate the unreacted monomers and e) recovering the desired styrene copolymer.

2. A method of producing a styrene copolymer having a weight average molecular weight of about 200,000 to 2,000,000, having 1 to 20 branching points in the Z-average molecular weight, and having a methyl ethyl ketone/methanol mixture-insoluble matter content of not more than 5% by weight and a menthanol-soluble matter content of not more than 5% by weight, which comprises the steps of a) feeding a homogeneous mixture of a styrene compound and 100 to 900 wt.ppm, relative to said styrene compound, of a compound having a plurality of vinyl groups to a polymerization vessel, optionally together with a compound copolymerizable with said styrene compound, and b) subjecting the mixture to a two-stage suspension polymerization comprising a first stage and a second stage using an initiator having a 10 hour-half-life temperature of lower than 100° C. in an amount of about 2000 to 3000 wt.ppm relative to the styrene compound and also using an initiator having a 10 hour-half-life temperature of at least 100° C. in an amount of about 200 to 1000 wt.ppm relative to the styrene compound, until a final conversion of at least 97 wt. % is reached, wherein in said first stage the polymerization is conducted at a polymerization temperature of at least 80° C. but lower than 100° C. for about 3 to 7 hours and in said second stage the polymerization is conducted at a polymerization temperature of 100° to 150° C. for about 0.5 to 2 hours.

\* \* \* \* \*